U S006851817B2

(12) United States Patent
Wong

(10) Patent No.: US 6,851,817 B2
(45) Date of Patent: Feb. 8, 2005

(54) WHEEL INCORPORATING A FLASHING LIGHT FEATURE

(75) Inventor: Wai Kai Wong, Happy Valley (HK)

(73) Assignee: Cheerine Development (Hong Kong) Ltd. (HK)

( * ) Notice: Subject to any disclaimer, the term of this patent is extended or adjusted under 35 U.S.C. 154(b) by 57 days.

(21) Appl. No.: 10/288,206

(22) Filed: Nov. 4, 2002

(65) Prior Publication Data

US 2004/0085777 A1 May 6, 2004

(51) Int. Cl.⁷ ............................................. F21V 21/30
(52) U.S. Cl. .................... 362/35; 362/500; 362/800; 362/802; 301/5.301; 280/11.203; 315/76; 315/241 S
(58) Field of Search ...................... 362/35, 234, 486, 362/500, 800, 802, 806; 301/5.301; 280/11.203, 816; 315/76, 241 S

(56) References Cited

U.S. PATENT DOCUMENTS

| | | | |
|---|---|---|---|
| 4,363,502 A | 12/1982 | Bakerman | 280/816 |
| 5,392,200 A | * 2/1995 | Milde | 362/500 |
| 5,438,493 A | 8/1995 | Tseng | 362/103 |
| 5,475,572 A | 12/1995 | Tseng | 362/78 |
| 5,653,523 A | 8/1997 | Roberts | 362/78 |
| 5,730,520 A | 3/1998 | Hsu et al. | 362/78 |
| 5,779,344 A | 7/1998 | Tseng | 362/78 |
| 5,839,814 A | 11/1998 | Roberts | 362/78 |
| 5,894,201 A | 4/1999 | Wong | 315/241 |
| 5,957,541 A | 9/1999 | Seigler | 301/5.3 |
| 5,969,479 A | 10/1999 | Wong | 315/200 A |
| 6,170,968 B1 | 1/2001 | Caswell | 362/469 |
| 6,241,371 B1 | 6/2001 | Dai | 362/500 |
| 6,354,712 B1 | 3/2002 | Anteby | 362/103 |

* cited by examiner

Primary Examiner—Stephen F. Husar
(74) Attorney, Agent, or Firm—Brinks Hofer Gilson & Lione

(57) ABSTRACT

A wheel incorporating a flashing light feature includes a power source, a plurality of lighting elements and a flashing circuit to selectively provide lighting signals to the plurality of lighting elements. The wheel incorporating a flashing light feature further includes at least two motion switches to activate the flashing circuit. The at least two motion switches include a spring having a fixed end and a free end and a metal cap positioned proximate the free end of the spring for electrical engagement by the free end of the spring. Examples of articles with a wheel incorporating a flashing light feature include scooters, roller skates, in line skates, roller shoes and other types of wheeled footwear.

25 Claims, 4 Drawing Sheets

WHEEL INCORPORATING A FLASHING LIGHT FEATURE

BACKGROUND

The present invention relates generally to wheels for scooters, roller skates, in-line skates, roller shoes, and other types of wheeled footwear. More particularly, the present invention relates to scooters, roller skates, in line skates, roller shoes and other types of wheeled footwear with a wheel incorporating a flashing light feature.

It has been observed that a wheel incorporating a flashing light feature produces a pleasing display as well as improves the visibility of the wearer. However, there is a need to increase the battery life of a wheel incorporating a flashing light feature. Prior wheels incorporating a flashing light feature attempted to remedy this by either using a manually operated on/off switch or using some type of motion switch. Both solutions, however, were unsatisfactory.

The use of a manual switch required the user to remember to switch on the flashing light feature before use and to remember to switch off the flashing light feature after use. Many users failed to remember to turn on the flashing light feature, thus, the pleasing display and improved visibility features were not fully utilized. Other users failed to remember to turn off the flashing light feature, thus, draining the battery when the article incorporating the flashing light feature was not being utilized.

In an attempt to solve the problem of users forgetting to turn the flashing light feature on or off, a motion sensitive switch was added to the flashing light feature. However, this solution was still plagued with problems of activation of the flashing light feature during storage or transportation of an article containing a wheel incorporating a flashing light feature. For example, if the switch was positioned is such a way that gravity acted on the movable components of the switch, the flashing light feature would activate during storage or transportation of the article incorporating the flashing light feature. Because of this, it is desirable to have a flashing light system that conserves battery life by only operating when centrifugal force is present due to the rotation of a wheel. Accordingly, there is a need for an improved method and apparatus providing a wheel incorporating a flashing light feature.

BRIEF SUMMARY

By way of introduction only, a wheel incorporating a flashing light feature includes a power source, lighting elements, and a flashing circuit to selectively provide lighting signals to the lighting elements. The wheel incorporating a flashing light feature further includes at least two motion switches, such as spring switches, to activate the flashing circuit. The at least two motion switches are connected to an electrical circuit in such a way that only both switches being in the closed position at the same time activates the flashing light feature. In one embodiment, the motion switches are positioned with an angle between the switches so that a striking force, vibration or gravity alone cannot close both switches simultaneously. Due to the angle between the motion switches, the switches activate only due to the centrifugal forces generated by the rotation of the wheel about its central axis.

A motion switch can be of any type. In one embodiment, the motion switch includes a spring having a fixed end and a free end and a metal cap positioned proximate the free end of the spring for electrical engagement by the free end of the spring. The type of spring used in the motion switch can be of any type. In one embodiment, the spring may be a coil spring. In another embodiment, the spring may be a leaf spring.

Thus, the disclosed wheel incorporating a flashing light feature incorporates a light flashing system which is triggered by the rotational motion of the wheel causing the at least two motion switches to close. Upon triggering, a control circuit applies the necessary control signals to illuminate one or more lighting elements. The lighting elements flash in a particular pattern. The flashing lights are decorative and entertaining and enhance the value of the wheeled device. Also, the flashing lights improve the visibility of the wheel incorporating a flashing light feature for the user.

The wheel incorporating a flashing light feature may be embodied in any one of a wide variety of embodiments. Examples include scooters, roller skates, in-line skates and wheeled roller shoes. These listed embodiments are exemplary only. In these examples, the wheel incorporating a flashing light feature benefits from the improved visibility provided by the incorporated lighting system and its entertainment value is also enhanced.

It is a further feature of the disclosed wheel incorporating a flashing light feature that, in some embodiments, the power source includes one or more batteries. The wheel incorporating a flashing light feature may be designed with replaceable batteries, incorporating an accessible battery compartment for removable and replacement of the batteries.

Other features and advantages of the disclosed embodiments, as well as alternative embodiments to which the concepts disclosed herein may be extended, will be evident from the following description. The foregoing discussion of illustrative embodiments of the invention has been provided only by way of introduction. Nothing in this section should be taken as a limitation on the following claims, which define the scope of the invention.

DETAILED DESCRIPTION OF THE PRESENTLY PREFERRED EMBODIMENTS

Figure 1:
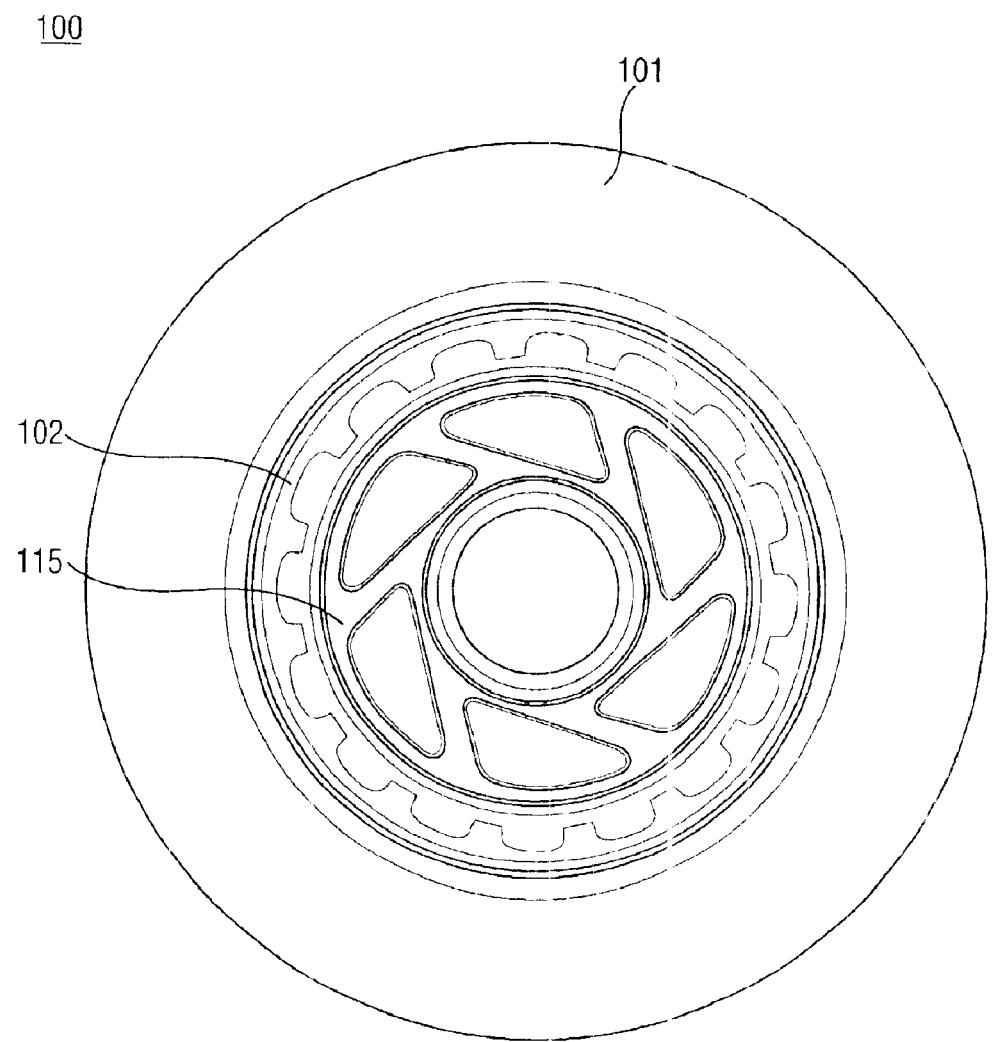
FIG. 1 is an elevation view of an embodiment of a wheel incorporating a flashing light feature.
Figure 1A:
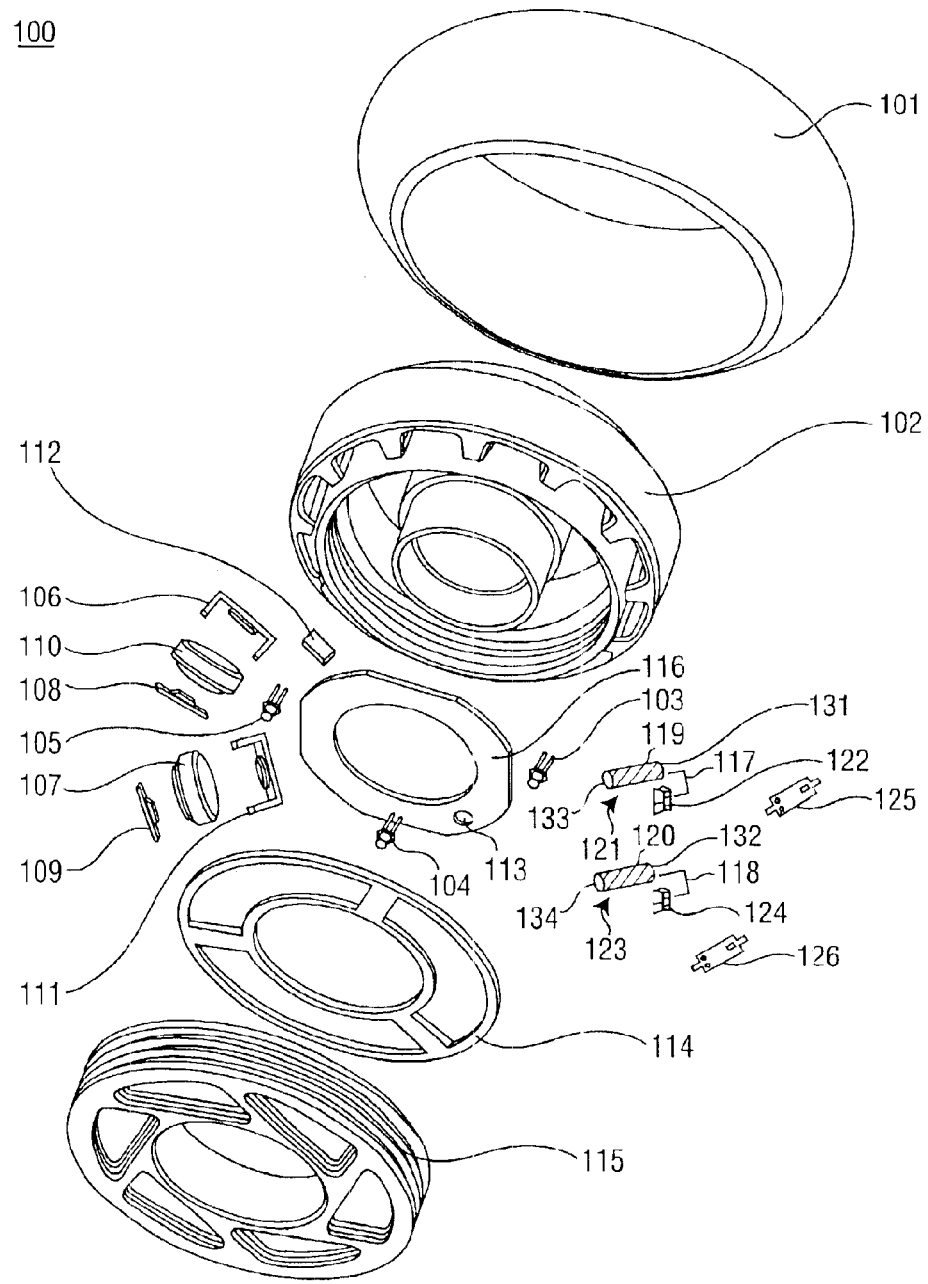
FIG. 1A is an exploded view of an embodiment of a wheel incorporating a flashing light feature of FIG. 1.
Figure 2:
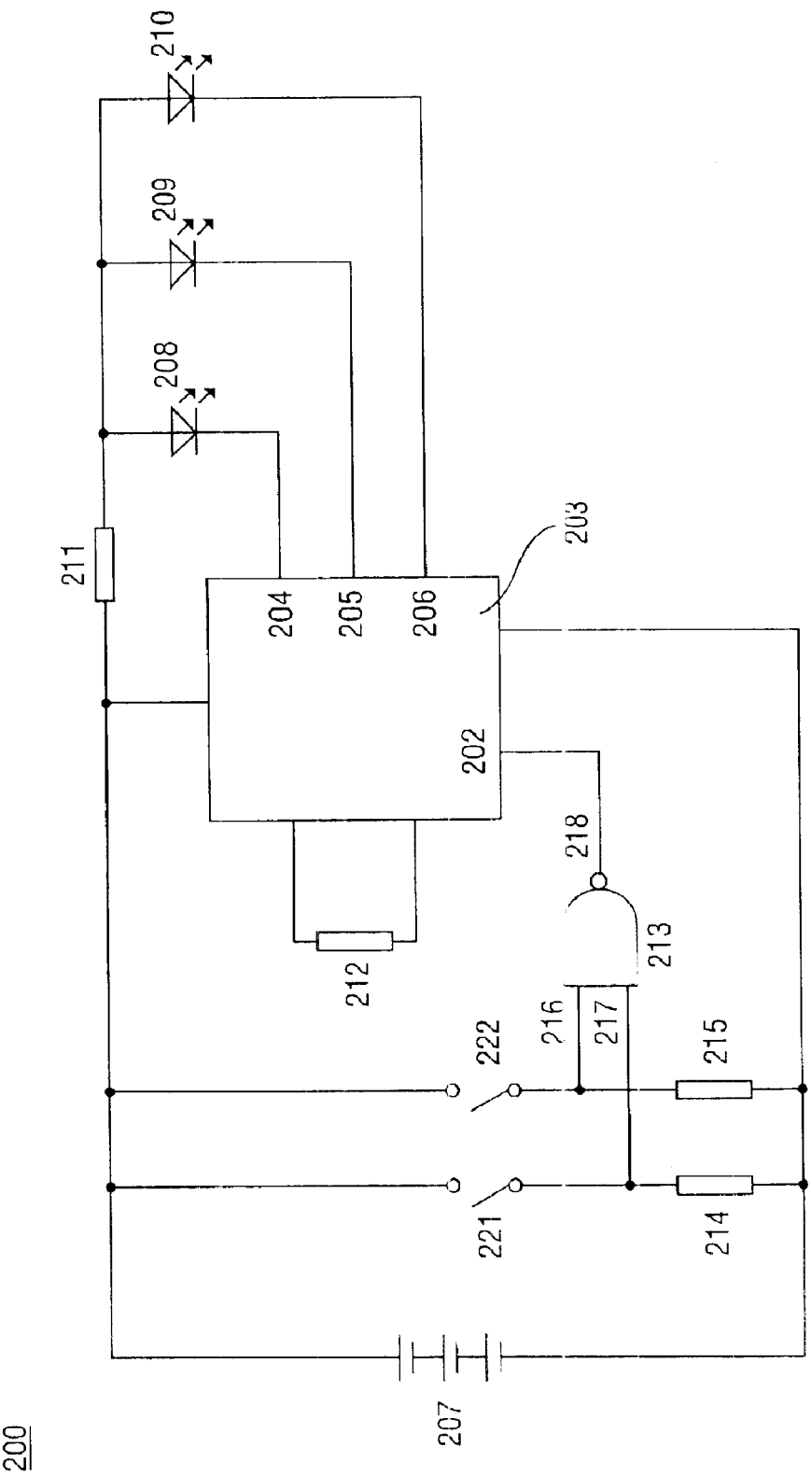
FIG. 2 is a schematic diagram of light switching circuit for use in a wheel incorporating a flashing light feature of FIG. 1.
Figure 3:
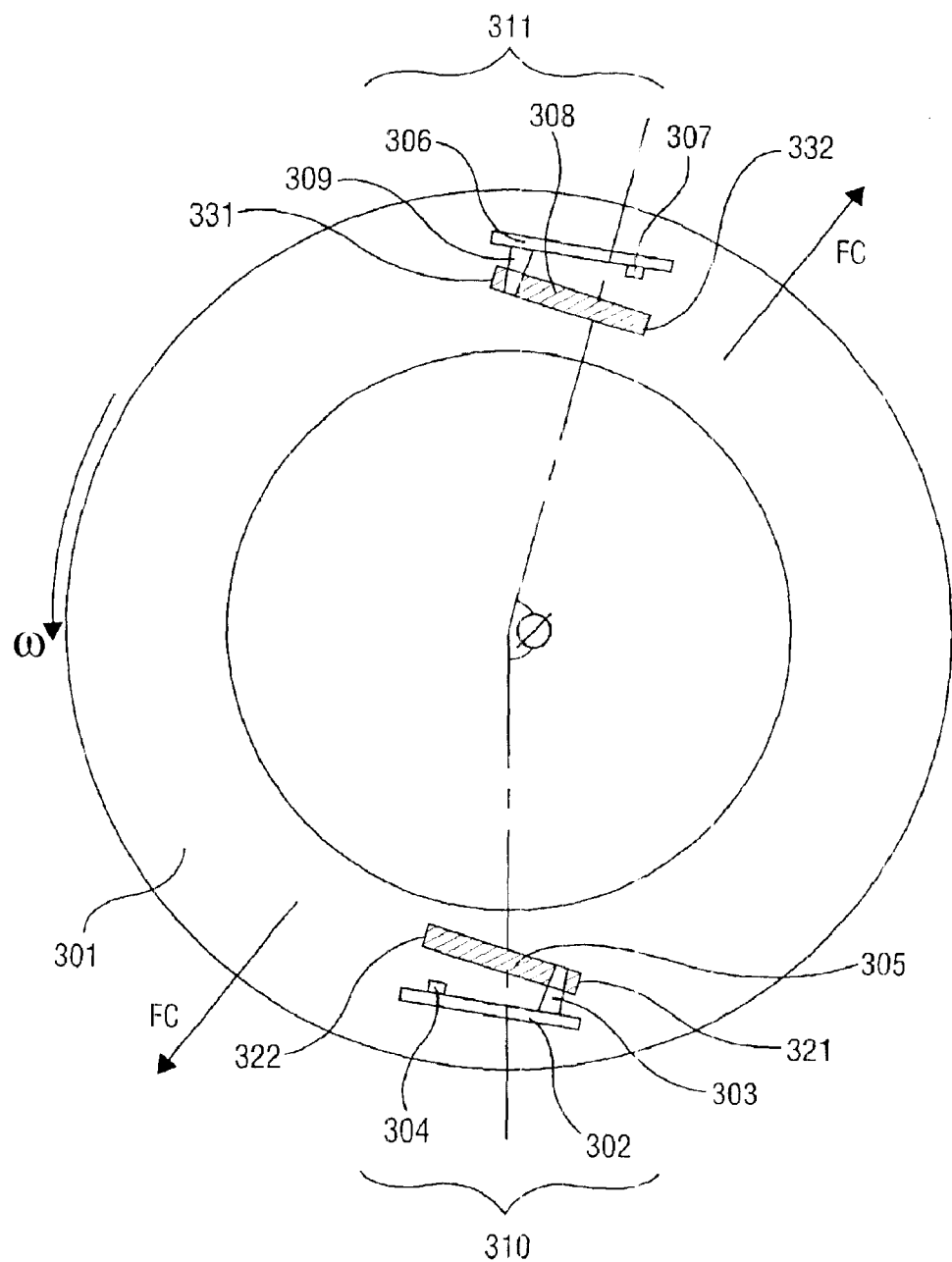
FIG. 3 is a cross section view of the spring switches for use in a wheel incorporating a flashing light feature of FIG. 1.

Referring to the drawing, FIGS. 1 and 1A show views of a wheel including a flashing light feature. FIG. 1 is an elevation view of an embodiment of a wheel incorporating a flashing light feature. FIG. 1A is an exploded view of an embodiment of a wheel incorporating a flashing light feature of wheel 100. FIG. 2 is a schematic diagram of a light switching circuit for use in a wheel incorporating a flashing light feature of FIGS. 1 and 1A. FIG. 3 is a cross section view of the spring switches for use in a wheel incorporating a flashing light feature of FIGS. 1 and 1A Referring to FIG. 1, it shows an elevation view of a wheel incorporating a flashing light feature 100. The wheel incorporating a flashing light feature 100 includes a ring-shaped elastic material 101 forming the tire portion of the wheel, a specially designed circular plastic housing 102 and a specially designed circular plastic cover 115.

Referring to FIG. 1A, it shows an exploded view of a wheel incorporating a flashing light feature 100. The wheel incorporating a flashing light feature includes a ring-shaped elastic material 101 forming the tire portion of the wheel, a specially designed circular plastic housing 102, a plurality of lighting elements 103, 104 and 105, a first battery positive terminal metal plate 106, a second positive terminal metal plate 111, a first battery 107, a second battery 110, a first battery negative terminal metal plate 108, a second battery negative terminal metal plate and 109, at least one resistor 112, at least one integrated circuit 113, at least one O-ring 114, a circular plastic cover 115, a printed circuit board 116, and at least two motion switches 117 and 118.

In one embodiment, the integrated circuit 113 may be a M1389 integrated circuit manufactured by MOSDESIGN Semiconductor Corporation of Taiwan.

In one embodiment, two battery positive terminal metal plates 106 and 111, two batteries 107 and 110, and two battery negative terminal metal plates 108 and 109 are used. In another embodiment, only one battery positive terminal metal plate 106, only one battery 110, and only one battery negative terminal metal plate 108 are used. In another embodiment, only one battery positive terminal metal plate 111, only one battery 107, and only one battery negative terminal metal plate 109 are used.

In an embodiment, each of the at least two motion switches 117 and 118 are similar. Motion switch 117 contains a spring 119, an arch 121, a spring stand 122, and a spring base 125. The spring stand 122 is operatively connected to the spring base 125. The spring 119 has a first spring end 131 and a second spring end 133. The first spring end 131 of the spring 119 is operatively connected to the spring stand 122. The arch 121 is operatively connected to the spring base 125 proximate to the second spring end 133 of the spring 119. The second spring end 133 of the spring 119 is free standing and can move into contact with the arch 121 in response to centrifugal force when the wheel incorporating a flashing light feature 100 is rotated.

Motion switch 118 contains a spring 120, an arch 123, a spring stand 124, and a spring base 126. The spring stand 124 is operatively connected to the spring base 126. The spring 120 has a first spring end 132 and a second spring end 134. The first spring end 132 of the spring 124 is operatively connected to the spring stand 124. The arch 123 is operatively connected to the spring base 126 proximate to the second spring end 134 of the spring 124. The second spring end 134 of the spring 124 is free standing and can move into contact with the arch 123 in response to centrifugal force when the wheel incorporating a flashing light feature 100 is rotated.

In another embodiment, the at least two motion switches 117 and 118 are different.

The spring base 125 and 126 may be made of any suitable material. In one embodiment, the spring base 125 and 126 is a printed circuit board. The spring stand 122 and 124 may be made of any suitable material. In one embodiment, the spring stand 122 and 124 is made of conductive material. The arch 121 and 123 may be made of any suitable material. In one embodiment, the arch 121 and 123 is made of a conductive material. The spring 119 and 124 may be any suitable type of spring. In one embodiment, the spring 119 and 124 may be made of a conductive material. In another embodiment, the spring 119 and 124 may be a coil spring. In still another embodiment, the spring 119 and 124 may be a leaf spring.

When the wheel incorporating a flashing light feature 100 is rotated, the second spring ends 133 and 134 of the springs 119 and 120 become electrically connected to the metal arches 121 and 123 due to centrifugal force thus closing the at least two motion switches 117 and 118. When these at least two motion switches 117 and 118 are closed at the same time, the integrated circuit 113 is actuated for illuminating the plurality of lighting elements 103, 104 and 105 with a special pattern.

The circular plastic cover 115 covers the plastic housing 102, and in conjunction with the O-ring 114, provides an interior water resistant cavity for the printed circuit board 116. The ring-shaped elastic material 101 is made of elastic material such as polyurethane.

Referring to FIG. 2, it shows a circuit 200 for use in the wheel incorporating a flashing light feature 100. The circuit 200 includes at least two motion switches 221 and 222, an integrated circuit 203, a power source, such as at least one battery, 207, a plurality of light sources, such as Light Emitting Diodes (LED's) 208, 209 and 210, a plurality of resistors 211, 212, 214 and 215, and at least one digital logic gate 213.

The integrated circuit 203 includes an enable or triggering pin 202 and a plurality of output pins 204, 205, and 206. In one embodiment, the enable or trigger pin 202 requires a Low (0) level to enable or trigger the integrated circuit 203. In one embodiment, the integrated circuit 203 may be a M1389 integrated circuit manufactured by MOSDESIGN Semiconductor Corporation of Taiwan.

The digital logic gate includes at least two input terminals 216 and 217 to the digital logic gate 213 and an output terminal 218 from the logic gate 213. In one embodiment, the digital logic gate is a NAND gate. The digital logic gate 213 can be a AND instead of a NAND gate if the integrated circuit 202 requires a High (1) level to enable or trigger the integrated circuit 203. Additionally, a combination of digital logic gates 213 can be used to together to provide a signal to enable or trigger the integrated circuit 203. Further, if more than at least two motion switches 221 and 222 are used, a AND or NAND gate with more than two inputs may be utilized as is well known in the art. The digital logic gate or gates used should provide the proper voltage or signal level to the enable or trigger pin 202 to activate the integrated circuit 203 when all motion switches 221 and 222 are closed.

When the at least two motion switches 221 and 222 are both closed, the input terminals 216 and 217 of the digital logic gate 213 change to High (1) and the output terminal 218 of the NAND gate changes to Low (0). The output terminal 218 of the NAND gate is in electrical communication with the enable or trigger pin 202 of the integrated circuit 203. Therefore, when the output terminal 218 of the NAND gate changes from High (1) to Low (0), the enable or trigger pin 202 of the integrated circuit 203 also changes from High (1) to Low (0). Thus, when the enable or trigger pin 202 of the integrated circuit 203 changes from High (1) to Low (0) the integrated circuit's 203 plurality of output pins 204, 205 and 206 are activated to provide a drain for the plurality of LED's 208, 209 and 210 thus illuminating the plurality of LED's 208, 209 and 210.

In an embodiment, the digital logic gate 213 is a NAND gate. In another embodiment, the digital logic gate 213 is an AND gate. In an embodiment, the integrated circuit 203 is a Low (0) triggered integrated circuit. In another embodiment, the integrated circuit 203 is a High (1) triggered integrated circuit. In an embodiment, the plurality of outputs 204, 205 and 206 can change state with a predetermined sequence, thus causing some, none or all of the plurality of LED's 208, 209 and 210 to be illuminated in a pattern. In another embodiment, the plurality of outputs 204, 205 and 206 can change state with an un-predetermined or random sequence, thus causing some, none or all of the plurality of LED's 208, 209 and 210 to be illuminated in a pattern.

To illuminate one of the plurality of LED's 208, 209 and 210, one of the plurality of outputs 204, 205 and 206 will change state from High (1) to Low (0). The current will flow from the battery 207 to at least one resistor 211, to at least one of the plurality LED's 208, 209 and 210 and to at least one of the corresponding plurality of outputs 204, 205 and 206. To extinguish one of the plurality of LED's 208, 209 and 210, the previously changed output from the plurality of outputs 204, 205 and 206 will change state again from Low (0) to High (1) thus extinguishing the lit LED 208, 209 and 210. When this process is repeated, the plurality of LED's 208, 209, 210 will flash as a result. In another embodiment, the circuit can be reconfigured so the plurality of outputs 204, 205 and 206 provide current to, rather than drain current from the plurality of LED's 208, 209 and 210.

When the at least two motion switches 221 and 222 are both open or at least one of the at least two motion switches 221 or 222 is open, the integrated circuit's 203 enable or triggering pin 202 will be High (1) which prevents activation of the integrated circuit 203. The following truth table shows the results of the various combinations of motion switch positions. Only when both motion switches are closed, or High (1) is the output Low (0) as required to activate the integrated circuit 203.

| Switch 221 | Switch 222 | Input-terminal 216 | Input-terminal 217 | Output-terminal 218 |
| --- | --- | --- | --- | --- |
| Close (High) | Close (High) | High | High | Low |
| Close (High) | Open (Low) | Low | High | High |
| Open (Low) | Close (High) | High | Low | High |
| Open (Low) | Open (Low) | Low | Low | High |

Referring to FIG. 3, it shows a cross sectional view of the at least two motion switches 310 and 311 and their relative location on the printed circuit board 301. It shows that each of the at least two motion switches 310 and 311 operatively connected to the printed circuit board 301 and are similar in construction.

Motion switch 310 contains a spring 305, an arch 304, a spring stand 303, and a spring base 302. The spring stand 303 is operatively connected to the spring base 302. The spring 305 has a first spring end 321 and a second spring end 322. The first spring end 321 of the spring 305 is operatively connected to the spring stand 303. The arch 304 is operatively connected to the spring base 302 proximate to the second spring end 322 of the spring 305. The second spring end 322 of the spring 305 is free standing and can move into contact with the arch 304 in response to centrifugal force when the printed circuit board 301 is rotated.

Motion switch 310 contains a spring 305, an arch 304, a spring stand 303, and a spring base 302. The spring stand 303 is operatively connected to the spring base 302. The spring 305 has a first spring end 321 and a second spring end 322. The first spring end 321 of the spring 305 is operatively connected to the spring stand 303. The arch 304 is operatively connected to the spring base 302 proximate to the second spring end 322 of the spring 305. The second spring end 322 of the spring 305 is free standing and can move into contact with the arch 304 in response to centrifugal force when the printed circuit board 301 is rotated.

Motion switch 311 contains a spring 308, an arch 307, a spring stand 309, and a spring base 306. The spring stand 309 is operatively connected to the spring base 306. The spring 308 has a first spring end 331 and a second spring end 332. The first spring end 331 of the spring 308 is operatively connected to the spring stand 309. The arch 307 is operatively connected to the spring base 306 proximate to the second spring end 332 of the spring 308. The second spring end 332 of the spring 308 is free standing and can move into contact with the arch 307 in response to centrifugal force when the printed circuit board 301 is rotated.

The at least two motion switches 310 and 311 are placed such that an angle $\emptyset$ is formed between them. This angle between the at least two motion switches 310 and 311 should be greater than about 45° but less than about 315°. By positioning the at least two motion switches 310 and 311 in this way the at least two motion switches 310 and 311 are prevented from closing at the same time by a striking force, a vibrating force or the force of gravity. The at least two motion switches 310 and 311 can only close at the same time due to the centrifugal force exerted on the at least two motion switches due to rotation. The angular velocity $\omega$ must be great enough to produce a centrifugal force Fc great enough to bend the spring 305 and 308 enough such that the spring touches the arch 304 and 307, thus completing the circuit.

From the foregoing, it can be seen that the present embodiments provide a wheel incorporating flashing light feature. The wheel incorporating flashing light feature may be embodied in any of a wide range of configurations. Generally, the wheel incorporating flashing light feature includes a housing and a light flashing system. The light flashing system in the illustrated embodiments includes a spring switch to activate a flashing circuit. The flashing circuit drives lighting elements which are visible. The components of the light flashing system are small enough and mechanically adaptable enough to be modified to fit the widest variety of wheels including scooters, roller skates, in-line skates, roller shoes, and other types of wheeled footwear. Further, decorative elements may be applied to the exterior surface of the wheel incorporating flashing light feature.

While a particular embodiment of the present invention has been shown and described, modifications may be made. For example, other types of devices with a wheel incorporating a flashing light feature, other than those shown and described herein, may be adapted to incorporate the operative and structural features described herein. It is therefore intended in the appended claims to cover all such changes and modifications which fall within the true spirit and scope of the invention.

What is claimed is:

1. A wheel incorporating a flashing light feature comprising:
   a plurality of light sources;
   a flashing circuit to selectively provide lighting signals to the plurality of light sources; and
   at least two motion switches operatively connected to the flashing circuit and arranged circumferentially around an axis of rotation of the wheel to activate the flashing circuit when the wheel is in motion, the at least two motion switches including a spring having a fixed end and a free end, and
an arch positioned proximate the free end of the spring for electrical engagement by the free end of the spring.

2. The wheel incorporating a flashing light feature of claim 1 further comprising:
a power source.

3. The wheel incorporating a flashing light feature of claim 1 wherein an angle is formed between the at least two motion switches and the angle formed is greater then about 45 degrees.

4. The wheel incorporating a flashing light feature of claim 1 wherein an angle is formed between the at least two motion switches and the angle formed is less then about 315 degrees.

5. The wheel incorporating a flashing light feature of claim 1 further comprising:
leads coupling the springs of the at least two motion switches and the arches of the at least two motion switches with the flashing circuit.

6. The wheel incorporating flashing light feature of claim 5 further comprising:
a housing containing the power source, the lighting elements, the flashing circuit and the at least two motion switches.

7. The wheel incorporating a flashing light feature of claim 1 wherein the at least two motion switches further comprise a spring base of the at least two motion switches which is a printed circuit board.

8. The wheel incorporating a flashing light feature of claim 1 wherein the at least two motion switches further comprise a spring stand of the at least two motion switches which is made of conductive material.

9. The wheel incorporating a flashing light feature of claim 1 wherein the arch of the at least two motion switches is made of conductive material.

10. The wheel incorporating a flashing light feature of claim 1 wherein the spring of the at least two motion switches is made of conductive material.

11. The wheel incorporating a flashing light feature of claim 10 wherein the spring of the at least two motion switches is a coil spring.

12. The wheel incorporating a flashing light feature of claim 10 wherein the spring of the at least two motion switches is a leaf spring.

13. The wheel incorporating a flashing light feature of claim 1 wherein the wheel incorporating a flashing light feature is operatively connected to one of:
a scooter;
a roller skate;
an in-line skate; and
a roller shoe.

14. The wheel incorporating a flashing light feature of claim 1 wherein the at least two motion switches are electronically coupled to the flashing circuit to provide switching signals to the flashing circuit.

15. The wheel incorporating a flashing light feature of claim 14 wherein the switching signals have a predetermined logical relationship and cause the flashing circuit to provide a signal to the light sources.

16. The wheel incorporating a flashing light feature of claim 15 wherein the at least two motion switches are arranged to only close at the same time due to the centrifugal force of rotation of the wheel.

17. A circuit for a wheel incorporating a flashing light feature comprising:

a resistor;
a plurality of light sources operatively connected to the resistor;
a flashing circuit to selectively provide lighting signals to the plurality of light sources and operatively connected to the resistor;
a digital logic gate operatively connected to the flashing circuit; and
at least two motion switches operatively connected to the flashing circuit and the digital logic gate and arranged circumferentially around an axis of rotation of the wheel such that the flashing circuit is activated only when the wheel is rotated.

18. The circuit for a wheel incorporating a flashing light feature of claim 17 further comprising:
a power source.

19. The circuit for a wheel incorporating a flashing light feature of claim 17 further comprising:
an enable pin on the flashing circuit that requires a low level to enable the integrated circuit.

20. The circuit for a wheel incorporating a flashing light feature of claim 17 further comprising:
a plurality of output pins on the flashing circuit to drain current from the plurality of light sources.

21. The circuit for a wheel incorporating a flashing light feature of claim 17 wherein the digital logic gate is a two input NAND gate.

22. A wheel incorporating a flashing light feature comprising:
a power source;
a resistor operatively connected to the power source;
a plurality of light sources operatively connected to the resistor;
a flashing circuit to selectively provide lighting signals to the plurality of light sources and operatively connected to the resistor and the power source;
a digital logic gate operatively connected to the flashing circuit; and
at least two motion switches operatively connected to the flashing circuit and the digital logic gate and arranged circumferentially around an axis of rotation of the wheel with an angle between the at least two motion switches wherein the angle is greater then about 45 degrees to activate the flashing circuit when the wheel is in motion, the at least two motion switches including
a spring having a fixed end and a free end, and
an arch positioned proximate the free end of the spring for electrical engagement by the free end of the spring.

23. Wheeled footwear incorporating a flashing light feature comprising:
a plurality of light sources;
a flashing circuit to selectively provide lighting signals to the plurality of light sources; and
at least two motion switches operatively connected to the flashing circuit and arranged circumferentially around an axis of rotation of the wheel to activate the flashing circuit when the wheel is in motion, the at least two motion switches including
a spring having a fixed end and a free end, and
an arch positioned proximate the free end of the spring for electrical engagement by the free end of the spring.

24. The wheeled footwear incorporating a flashing light feature of claim 23 wherein the wheel footwear comprises one of:

a roller skate;

an in-line skate; and a roller shoe.

25. A wheel incorporating a flashing light feature, the wheel comprising a power source, a plurality of light sources connected to the power source and to a flashing circuit which selectively provides signals to the plurality of light sources, and at least two motion switches connected through a digital logic gate to the flashing circuit, the at least two motion switches including a spring flexible for electrical engagement by the spring due to centrifugal force produced when the wheel rotates to close the at least two motion switches at the same time, thus providing a signal to the digital logic gate allowing the flashing circuit to illuminate the light sources.

* * * * *